Patented Oct. 26, 1926.

1,604,374

UNITED STATES PATENT OFFICE.

NILS ALBREKTSSON, OF LIMHAMN, SWEDEN.

FOOD FOR CATTLE, SWINE, FOWLS, ETC., AND PROCESS FOR PRODUCING SUCH FOOD.

No Drawing. Application filed November 2, 1925, Serial No. 66,390, and in Sweden April 24, 1924.

This invention relates to food for cattle, swine, fowls et cetera and a process for producing such food, in which fish or fish-refuse in finely disintegrated condition is subjected to fermentation intermixed with disintegrated straw fodder. According to the invention the mixture is prepared out of fish or fish-refuse and straw fodder and in addition also of potato-mash and under certain circumstances of a minor quantity of molasses or other binding or flavouring substances or special nutrimental preparations. This mixture is allowed to ferment in maintaining a temperature suitable for the fermentation. Subsequent to the fermentation the mixture is dried in known manner, preferably by constantly stirring or working the same.

According to the invention it is further preferred to highly disintegrate (mechanically open the fibres of) the straw fodder to be used in the food mixture by incessantly working the same mechanically in a quickly running disintegrator. By this treatment the straw fodder becomes richer in digestible nutriments.

In the fermentation of the mash together with the fish and the fodder the combined carbohydrates are transformed into simple sugars and further a certain development of carbonic acid, alcohol and acetic acid and other organic acids takes place, which acids and alcohol directly preserve the fish and protect the same against putrefaction and finally facilitate its digestibility and reabsorption during the feeding, and they also flavour the food, so that it is greedily consumed by the cattle. The contents of digestible albumin in the food mixture also appears to bring about a favourable influence on the fermentation and appears to further the contents of the important vitamines in the food mixture. A further important result of the fermentation of the fish and the mash together with the finely disintegrated straw fodder is manifested in that, even when cattle is fed with this fermented food mixture the proceeds of the cattle are not accompanied by any disagreeable taste, which hitherto has proved to be a great disadvantage in the trials to utilize fish or fish-refuse as cattle food.

The process is carried into effect by admixing under stirring the mash and the disintegrated straw fodder to the fish mass. This mixture, to which may be added yeast and nutrimental yeast substances to a necessary or desirable extent, is allowed to ferment during a suitable time, for instance a couple of days, during which time an appropriate temperature is maintained for the proper progress of the fermentation process.

The proportions of the base materials in relation to each other may be varied, but it is preferred to so choose the proportions that each of the straw fodder particles is surrounded as far as possible by a thin layer of the mass to which they are admixed.

A preferred example of the food mixture is prepared in the following manner:—

As main base material is used fish or fish-refuse in raw condition, that is neither cooked nor salted. The fish or the fish-refuse is crushed or disintegrated in this raw condition including bones and everything else to form a uniform gruel like mass. About twelve parts of this mass are mixed with two parts of cooked potatoes and one part disintegrated straw. The cooked potatoes or mash are admixed in hot condition to the fish mass and thereupon the disintegrated straw is admixed. The water contents in the resulting mixture should be about 75%, and therefore water should be added to the ingredients or the mixture in appropriate quantities. The mixture is then allowed to settle and cool down, if necessary, until the temperature has sunk to about 40° centigrade. Thereupon about one cubic centimeter bad or so called blue milk is added for each kilogram of the mixture, said milk being specially rich in bacteria. The milk in question is such that has stood a time, so that it has become rotten without coagulating. Consequently to the addition of this milk the mixture is allowed to stand and ferment in a dark room or in covered containers at about 40° centigrade and during about 48 hours. During this time a vehement fermentation of the mass takes place, which fermentation has been initiated so to speak by the said milk addition, the bacteria contents of which is stimulated by the albumin of the fish and attacks the potatoes and the carbohydrates of the straw.

Subsequently to the fermentation the mass is formed into cakes and is preferably dried at uniform temperate heat. As an example the forming and drying may be carried out by pouring the mass in a thin layer in shallow open containers having perforated bottoms and by placing the containers thus filled in a hot room having appropriate ventilation. If it is desired, the cakes may be subjected to pressing or mangling between heated cylinders or the like, which however very often is superfluous. It has further proved to be useful to subject the mass, after its fermentation and before or after it is formed and dried, to an electric current of about 110 volts which has proved to be a very suitable voltage. It is to be understood however, that other voltages may also be applied, because the chief condition to be observed is to proportion the current density in such a manner that any carbonization or destroying of the food does not occur. The electrical treatment improves the appearance and durability of the product and seems to favourably influence its properties. But even without the electrical treatment the durability is of such high degree that the products will easily stand, transport and storing without impairing the quality of the cakes.

A product thus prepared having a water content of up to 30% has shown to be lasting during at least a whole year, that is to say it has not shown any tendency to mustiness or rancidness and therefore it is entirely durable regarding its appearance, taste and nutritive value, in which respects it favourably differentiates from oil cakes which have the tendency to become rancid and musty.

The product may be used for feeding cattle as well as swine and fowls and it has also proved to be valuable for admixing in crushed or ground condition to different kinds of strong food or other kinds of food for preparing a suitable compounded food mixture for cattle, swine and fowls.

The proportions stated above are to be considered as a preferred example, but obviously they could vary within very wide limits without the risk of impairing the contemplated result. It is also clear that other ingredients in minor quantities may be added without materially effecting the result.

What I claim and desire to secure by Letters Patent is:—

1. A process for producing food of the kind set forth which comprises highly disintegrating straw fodder, mixing the same together with fish or fish-refuse, potato-mash and a minor quantity of flavouring nutrimental substances, allowing this mixture to ferment and drying the mixture after fermentation.

2. A process for producing food of the kind set forth which comprises crushing fish or fish-refuse including bones et cetera in raw condition, mixing about twelve parts of the fish mass thus produced together with two parts cooked potatoes and one part highly disintegrated straw fodder, allowing this mixture to ferment and drying the mixture after fermentation.

3. A process for producing food of the kind set forth which comprises mixing fish or fish-refuse together with potato-mash and highly disintegrated straw fodder, allowing this mixture to ferment in a dark place during about 48 hours at a uniform temperature of about 40° centigrade and drying the mixture after fermentation.

4. A process for producing food of the kind set forth which comprises mixing fish or fish-refuse together with potato-mash and highly disintegrated straw fodder, adding water to this mixture so that it contains about 75% water, allowing the whole mixture to ferment and drying the mixture after fermentation.

5. A process for producing food of the kind set forth which comprises mixing fish or fish-refuse together with potato-mash and highly disintegrated straw fodder, adding bad or so called blue milk to this mixture in proportion of one cubic centimeter milk to every kilogram mixture, allowing the whole mixture to ferment and drying the mixture after fermentation.

6. A process for producing food of the kind set forth which comprises crushing fish or fish-refuse admixing thereto potato-mash in hot condition and admixing thereupon highly disintegrated straw fodder, thoroughly mixing the said three substances, allowing this mixture to ferment and drying the mixture after fermentation.

7. A food of the kind set forth comprising in intermixed, fermented and dried condition substantially fish or fish-refuse, potato-mash and highly disintegrated straw fodder.

In testimony whereof, I have signed my name to this specification.

NILS ALBREKTSSON.